US012556655B2

(12) United States Patent
Ullberg et al.

(10) Patent No.: US 12,556,655 B2
(45) Date of Patent: Feb. 17, 2026

(54) EFFICIENT DETECTION OF CO-LOCATED PARTICIPANT DEVICES IN TELECONFERENCING SESSIONS

(71) Applicant: Google LLC, Mountain View, CA (US)

(72) Inventors: Mans Gustaf Sebastian Ullberg, Stockholm (SE); Jesús de Vicente Peña, Stockholm (SE); Ivo Marco Creusen, Singapore (SG); Henrik Fahlberg Lundin, Sollentuna (SE)

(73) Assignee: GOOGLE LLC, Mountain View, CA (US)

( * ) Notice: Subject to any disclaimer, the term of this patent is extended or adjusted under 35 U.S.C. 154(b) by 250 days.

(21) Appl. No.: 18/297,357

(22) Filed: Apr. 7, 2023

(65) Prior Publication Data
US 2024/0340390 A1    Oct. 10, 2024

(51) Int. Cl.
*H04N 7/15*    (2006.01)
*H04N 7/14*    (2006.01)

(52) U.S. Cl.
CPC ............... *H04N 7/15* (2013.01); *H04N 7/147* (2013.01)

(58) Field of Classification Search
CPC ......... H04M 3/002; H04M 2203/2094; H04M 3/568; H04M 3/563; H04M 3/567;
(Continued)

(56) References Cited

U.S. PATENT DOCUMENTS 11,418,655 B2    8/2022  Loiko et al.
2012/0236110 A1*  9/2012  Ogle .................. H04L 12/1827
                                                         348/14.09
(Continued)

FOREIGN PATENT DOCUMENTS

EP           3070876           9/2016
EP           3070876 A1  *    9/2016
WO      WO-2024083906 A1  *    4/2024

OTHER PUBLICATIONS

Charif, RA, AM Waack, and LM Strickman., Raven Pro 1.4 User's Manual, 2010, Cornell Lab of Ornithology, Revision 11, Chapter 9 (379 Pages) (Year: 2010).*

(Continued)

*Primary Examiner* — Duc Nguyen
*Assistant Examiner* — Carissa A Jones
(74) *Attorney, Agent, or Firm* — DORITY & MANNING P.A.

(57) ABSTRACT

Audio data is captured by a participant computing device connected to a teleconferencing session using an audio capture device associated with the device. The audio data includes audio originating from an audio source co-located with the device. Subsequent to obtaining the audio data, second audio data is received that comprises second audio captured using a second audio capture devices associated with second participant computing devices connected to the teleconferencing session. Based on reception of the second audio data subsequent to capture of the audio data, a determination is made that some of the second audio originates from the audio source co-located with the device. Based on the determination, co-location information indicating that the device is co-located one or more of the second participant computing devices is generated.

19 Claims, 7 Drawing Sheets

(58) Field of Classification Search
CPC ........ H04N 7/15; H04N 7/147; G06F 3/0482; G06F 3/04845; G06T 11/00; G06V 20/41; G06V 20/46
USPC ......... 348/14.12, 14.03, 14.02, 14.08, 14.09, 348/14.1, 14.77, 14.78
See application file for complete search history.

(56) References Cited

U.S. PATENT DOCUMENTS

| | | | |
|---|---|---|---|
| 2016/0050491 A1* | 2/2016 | Ahgren | H04B 3/23 381/66 |
| 2017/0251182 A1* | 8/2017 | Siminoff | G06V 10/141 |
| 2024/0098413 A1* | 3/2024 | Litman | H04W 76/11 |

OTHER PUBLICATIONS

International Search Report and Written Opinion for Application No. PCT/US2023/078136, mailed Feb. 26, 2024, 14 pages.
International Preliminary Report on Patentability for Application No. PCT/US2023/078136, mailed Oct. 16, 2025, 9 pages.

\* cited by examiner

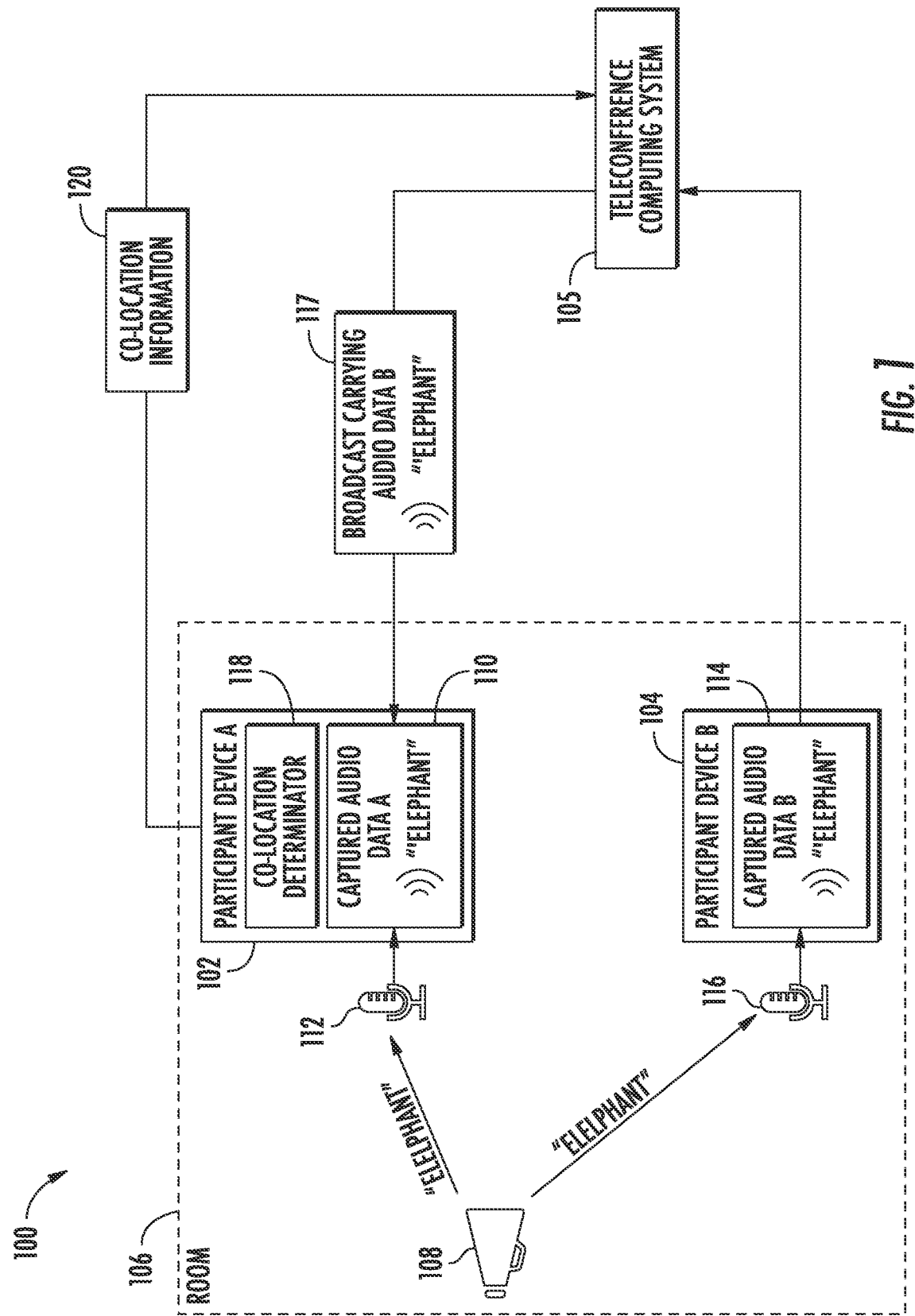

EFFICIENT DETECTION OF CO-LOCATED PARTICIPANT DEVICES IN TELECONFERENCING SESSIONS

FIELD

The present disclosure relates generally to detecting co-located devices. More specifically, the disclosure relates to analyzing audio data to determine whether any participant devices connected to a teleconferencing session are co-located.

BACKGROUND

Teleconferencing generally refers to the live exchange of communication data (e.g., audio data, video data, audiovisual data, textual content, etc.) between multiple participants. Common examples include audioconferences, videoconferences, multimedia conferences (e.g., sharing multiple types of communication data), etc. To participate in a teleconference, a participant can connect to a teleconferencing session using a computing device (e.g., a smartphone, laptop, etc.). The participant can use their device to transmit communication data to a teleconferencing system (e.g., a server system hosting the teleconference, etc.). The teleconferencing system can broadcast the transmitted communication data to the devices of other participants in the teleconferencing session.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method includes obtaining, by a participant computing device that comprises one or more computing devices and is connected to a teleconferencing session, audio data captured using an audio capture device associated with the participant computing device, wherein the audio data comprises audio originating from an audio source co-located with the participant computing device. The method includes, subsequent to obtaining the audio data, receiving, by the participant computing device, second audio data that comprises second audio captured using a plurality of second audio capture devices respectively associated with a plurality of second participant computing devices that are connected to the teleconferencing session. The method includes, based on the reception of the second audio data subsequent to the capture of the audio data, making, by the participant computing device, a determination that at least a portion of the second audio originates from the audio source co-located with the participant computing device. The method includes, based on the determination, generating, by the participant computing device, co-location information indicating that the participant computing device is co-located with at least one of the plurality of second participant computing devices.

Another example aspect of the present disclosure is directed to a participant computing device connected to a teleconferencing session. The participant computing device includes one or more processors and one or more non-transitory computer-readable media that store instructions that, when executed by the one or more processors, cause the participant computing device to perform operations. The operations include obtaining audio data captured using an audio capture device associated with the participant computing device, wherein the audio data comprises audio originating from an audio source co-located with the participant computing device. The operations include, subsequent to obtaining the audio data, receiving second audio data that comprises second audio captured using a plurality of second audio capture devices respectively associated with a plurality of second participant computing devices that are connected to the teleconferencing session. The operations include, based on the reception of the second audio data subsequent to the capture of the audio data, making a determination that at least a portion of the second audio originates from the audio source co-located with the participant computing device. The operations include, based on the determination, generating co-location information indicating that the participant computing device is co-located with at least one of the plurality of second participant computing devices.

Another example aspect of the present disclosure is directed to one or more non-transitory computer-readable media that store instructions that, when executed by one or more processors of a participant computing device connected to a teleconferencing session, cause the one or more processors to perform operations. The operations include obtaining audio data captured using an audio capture device associated with the participant computing device, wherein the audio data comprises audio originating from an audio source co-located with the participant computing device. The operations include, subsequent to obtaining the audio data, receiving second audio data that comprises second audio captured using a plurality of second audio capture devices respectively associated with a plurality of second participant computing devices that are connected to the teleconferencing session. The operations include, based on the reception of the second audio data subsequent to the capture of the audio data, making a determination that at least a portion of the second audio originates from the audio source co-located with the participant computing device. The operations include, based on the determination, generating co-location information indicating that the participant computing device is co-located with at least one of the plurality of second participant computing devices.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 1 depicts an overview data flow diagram for determining co-location between participant computing devices in a teleconferencing session according to some implementations of the present disclosure.

Figure 2A:
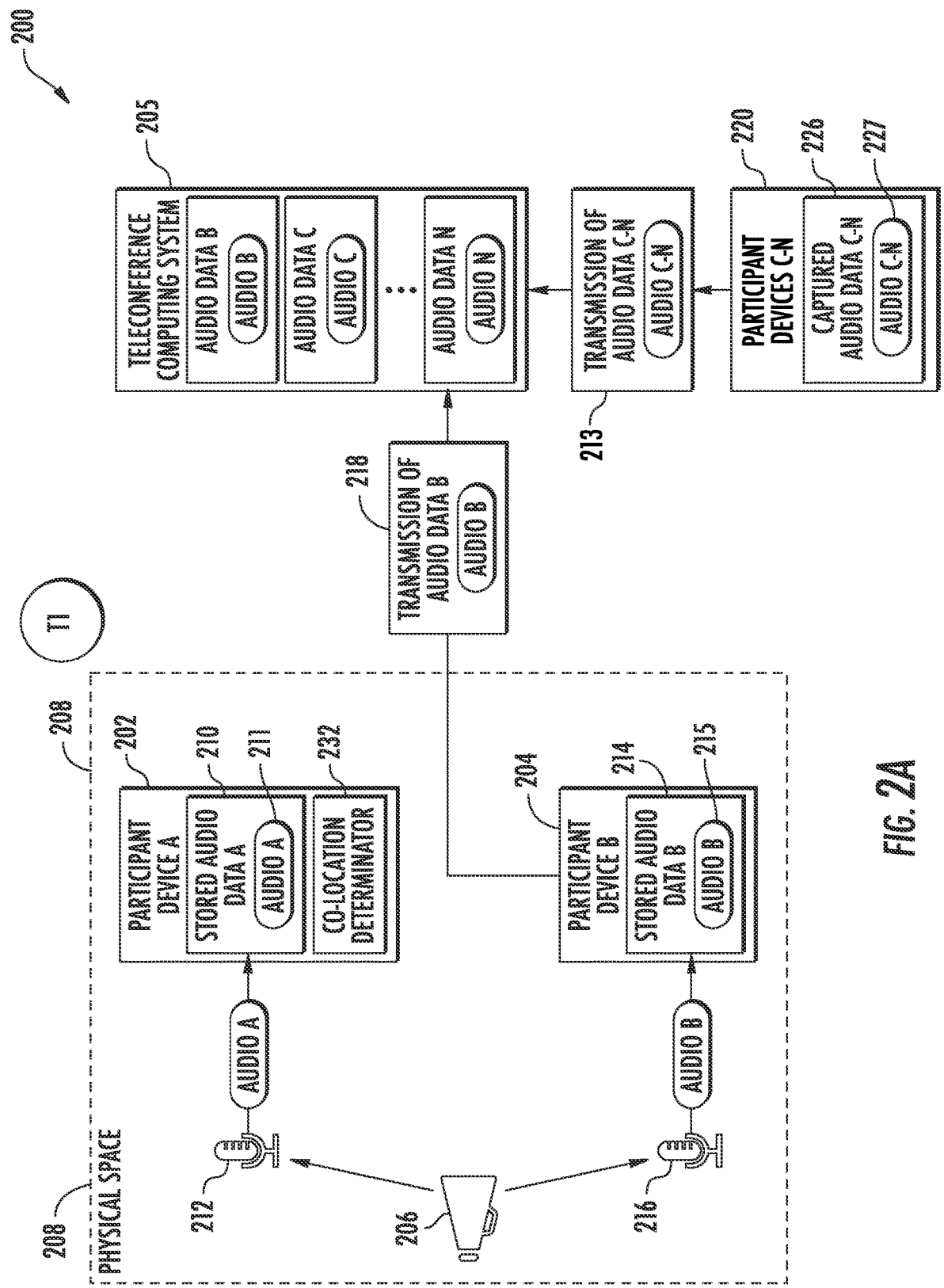
FIG. 2A depicts a more detailed data flow diagram for determining co-location at a time T1 between participant computing devices in a teleconferencing session according to some implementations of the present disclosure.

Reference numerals that are repeated across plural figures are intended to identify the same features in various implementations.

DETAILED DESCRIPTION

Generally, the present disclosure is directed to determining whether any devices connected to a teleconferencing session are co-located (e.g., located in the same room, etc.). Teleconferencing generally refers to the live exchange of communication data (e.g., audio data, video data, audiovisual data, textual content, etc.) between multiple participants. Common examples include audioconferences, videoconferences, multimedia conferences (e.g., sharing multiple types of communication data), etc. To participate in a teleconference, a participant can connect to a teleconferencing session using a computing device (e.g., a smartphone, laptop, etc.). The participant can use their device to transmit communication data to a teleconferencing system (e.g., a server system hosting the teleconference, etc.). The teleconferencing system can broadcast the transmitted communication data to the devices of other participants in the teleconferencing session.

More specifically, in some scenarios, such as large meetings, two participants of a teleconferencing session will decide to participate from the same room using their own individual devices. However, due to their proximity, when one participant speaks into their device, the other participant's device will also capture the participants speech. This can lead to a feedback loop called "howling", in which the inadvertently captured speech is repeatedly captured and played by both of the two closely located devices.

For example, participants John and Steve can sit next to each other at a conference table as they connect their individual devices to a teleconferencing session. If John says "Hello" into his device upon connecting, Steve's microphone can also inadvertently capture John's speech. Subsequently, as both devices capture and transmit audio of John's "hello", the speakers of John's device will play the audio transmitted from Steve's device and Steve's device will the audio transmitted from John's device. The audio from John's speakers will then be captured by Steve's microphone (and vice versa), causing a feedback loop that quickly drowns out the voices of any other participants.

Accordingly, implementations of the present disclosure propose the detection of co-located devices within a teleconferencing session so that "howling" can be prevented. To follow the previous example, John's device can receive and store the audio of John's "Hello" after it is captured (e.g., with an audio capture device of John's device). Steve's device can transmit the audio of John's "Hello" to a teleconferencing system that hosts the session. The teleconferencing system can mix the audio from Steve's device with audio transmitted from other participant devices, and then broadcast the mixed audio to John's device. Subsequently, John's device can determine that some portion of the broadcast (e.g., audio from Steve's device) originates from the same audio source as that of the audio that John's device stored previously. Based on this determination, John's device can inform the teleconferencing system that it is co-located with some other device connected to the session, thus allowing the teleconferencing system (or John's device) to take preventative action to mitigate any potential "howling". Furthermore, in scenarios in which the audio data broadcast by the teleconferencing system is not mixed (i.e., separate broadcasts of unmixed audio data), John's device can also inform the teleconferencing system of the identity of the device with which it is co-located.

Aspects of the present disclosure provide a number of technical effects and benefits. As one example technical effect and benefit, audio feedback loops that disrupt live teleconferencing sessions, such as "howling", are substantially more difficult to suppress or eliminate in comparison to other types of inadvertent audio capture, such as echo. As such, computing systems that host teleconferences must expend substantial quantities of computing resources to suppress "howling" or other types of audio feedback loops. However, aspects of the present disclosure provide the capability to determine device co-location before a feedback loop is created so that corrective action can be taken (e.g., local, device-level suppression of repeated audio, etc.). Accordingly, by detecting audio feedback loops before they occur, implementations of the present disclosure eliminate the use of substantial quantities of computing resources for suppressing audio feedback loops (e.g., power, memory, compute cycles, storage, etc.).

With reference now to the Figures, example implementations of the present disclosure will be discussed in further detail.

FIG. 1 depicts an overview data flow diagram 100 for determining co-location between participant computing devices in a teleconferencing session according to some implementations of the present disclosure. More specifically, a participant computing device 102 and a participant computing device 104 (e.g., laptops, smartphones, wearable devices, etc.) can be co-located within a room 106. Both devices can be connected to a teleconferencing session that is facilitated by teleconference computing system 105. For example, the participant computing device 102 and participant computing device 104 may be the laptops of two participants sitting in the same teleconferencing room. Although the participant computing devices 102 and 104 are both depicted as located in room 106, it should be noted that the "room" 106 can be to any type or manner of physical space (e.g., a booth, a semi-enclosed space, a desk, an office, etc.).

The room 106 can also include an audio source 108. The audio source 108 can be any type or manner of entity that produces audio (e.g., a television speaker, a participant vocalizing a spoken utterance, a dropped object, etc.). The audio produced by the audio source 108 can be captured as audio data 110 by an audio capture device 112 associated with the participant computing device 102. Concurrently, however, the audio produced by the audio source 108 can also be captured as audio data 114 by an audio capture device 116 associated with participant computing device 104.

For example, as depicted, the audio source 108 can be a participant associated with the participant device 102. The participant can be asked a question (e.g., "who would win, a grizzly bear or an elephant?"), and in response, the participant (e.g., audio source 108) can respond by speaking the word "elephant" into the audio capture device 112, which can capture the speech as audio data 110. However, due to the proximity of participant computing devices 102 and 104, the audio capture device 116 can also inadvertently capture the speech as audio data 114.

As participant devices 102 and 104 are connected to the teleconferencing session, both devices will generally transmit audio as it is captured to the teleconference computing system 105. The teleconference computing system 105 will broadcast any audio data received from one device to the rest of the devices connected to the teleconferencing session. For example, once the teleconference computing system 105 receives a transmission of audio data 114 from the participant computing device 104, it can transmit a broadcast 117 that carries the audio data 114 to the participant computing device 102 (and any other participant computing devices connected to the session).

A conventional participant computing device 102 can use an audio output device (e.g., speakers) to play any audio carried in the broadcast 117. However, as described previously, once the participant computing device 102 plays the audio data 114, the participant will hear themselves speaking "elephant" (e.g., echo), which can reduce the immersion of the participant. Furthermore, if the audio capture device 112 inadvertently captures audio from the audio output device (e.g., of the word "elephant"), and then transmits that audio data to the teleconference computing system 105, it will cause a feedback loop that will quickly render communication in the teleconferencing session impossible (e.g., "howling").

As such, according to aspects of the present disclosure, the participant computing device 102 can make a determination (e.g., using co-location determinator 118) that the audio data 114 originates from the same audio source 108 as the previously captured audio data 110 (e.g., that the word "elephant" is from the same participant). Specifically, as both audio data 110 and 114 carry audio from the same audio source 108, and the participant computing device 102 captured the audio data 110 prior to receiving the audio data 114 (via broadcast 117), the participant computing device 102 can determine that it must be co-located with some other device (e.g., participant device 104). The participant computing device 102 can generate co-location information 120 to inform the teleconference computing system 105 that it is co-located with some other device so that the teleconference computing system 105 can take preventative (or corrective) action. Furthermore, as the broadcast 117 is carrying audio data from the participant device 104, and is not carrying mixed audio data, the audio data can indicate which device it originates from (e.g., indicating that it was captured at participant device 104). Accordingly, by determining that it is co-located with another device based on the, the participant computing device 102 can also determine that it is co-located with participant computing device 104.

To transmit or receive any data or information, the devices and/or systems of FIG. 1 can utilize various network(s) (e.g., wired networks, wireless networks, etc.). Network(s) and methods of communication will be discussed in greater detail with regards to FIG. 6 (e.g., Network(s) 699 of FIG. 6, etc.).

FIG. 2A depicts a more detailed data flow diagram 200 for determining co-location at a time T1 between participant computing devices in a teleconferencing session according to some implementations of the present disclosure. More specifically, at a first time T1 (e.g., an instant in time, a first time period, etc.) participant computing device 202, participant computing device 204, and audio source 206 can each be located in the same physical space 208 (e.g., a room, an auditorium, a booth, a car, etc.). Both participant computing devices 202 and 204 can be participating in the same teleconferencing session hosted by teleconference computing system 205. The audio source 206 can produce audio, which can be captured as audio 211 in audio data 210 by the participant computing device 202 using an audio capture device 212. As described with regards to FIG. 1, due to their proximity, the participant device 204 can also capture the audio from the audio source 206 as audio 215 in audio data 214 using audio capture device 216.

Figure 2B:
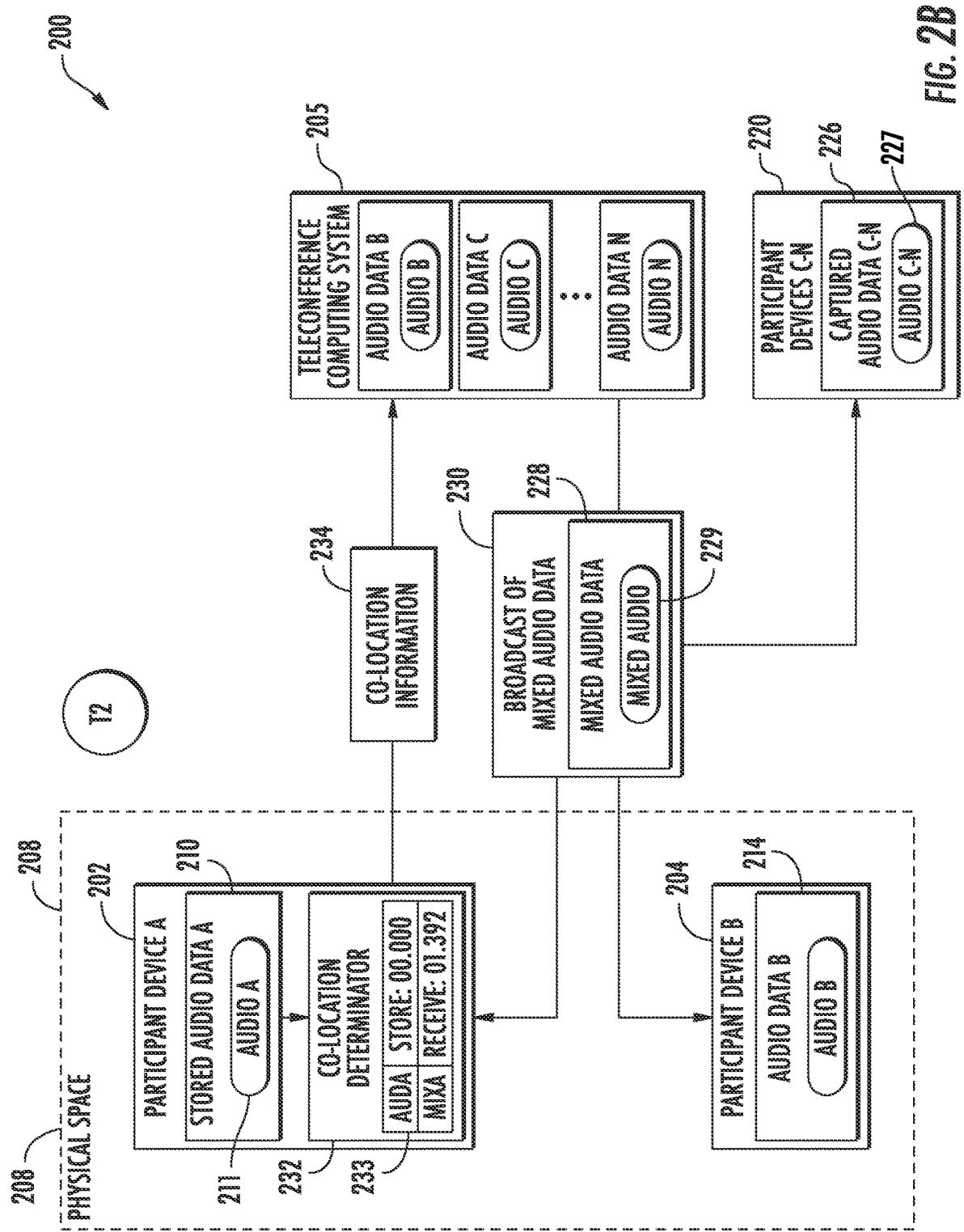
FIG. 2B depicts the data flow diagram of FIG. 2A at a time T2 according to some implementations of the present disclosure.

Time T1, and time generally, is depicted in FIGS. 2A and 2B to demonstrate the temporal relationship between receipt of audio data and capture of audio data, For example, audio produced by an audio source can be captured by two participant devices at time T1. Once captured, one of the participant devices encodes the audio data and transmits the audio data to a teleconferencing computing system, where the audio data is mixed with additional audio data and broadcast as mixed audio data to the participant device. However, transmitting, encoding, mixing, and broadcasting audio data takes time, and as such, the participant device does not receive the broadcast of the mixed audio data until a time T2 which occurs after time T1. As such, if the mixed audio data is received by the participant computing device prior to time T1, rather than after time T1 (i.e., time T2), then the participant computing device can make a determination that the mixed audio and the audio do not originate from the same audio source.

At time T1, the participant computing device 204 can provide a transmission 218 to that includes audio data 214 to the teleconference computing system 205 that is hosting the teleconferencing session. The participant computing device 202 can store the audio data 210 (e.g., in a memory device, etc.). In some implementations, the participant computing device 202 can also transmit the audio data 210 to the teleconference computing system 205. Alternatively, in some implementations, the participant computing device 202 can store the audio data 210 without transmitting the audio data. For example, the participant associated with participant computing device 202 may select a "mute" teleconference interface option to block transmission of audio data, and the participant computing device 202 can still store the audio data 210 to subsequently determine co-location with other devices.

It should be noted that devices other than participant computing devices 202 and 204 can be connected to the teleconferencing session. Specifically, participant computing devices 220 can be connected to the teleconferencing session, and can each provide transmissions (generally, transmissions 213) that includes audio data. For example, each of the participant devices 220 can capture audio originating from a different audio source at a different location (collectively audio 227) as audio data (collectively, audio data 226).

Turning to FIG. 2B, FIG. 2B depicts the data flow diagram 200 of FIG. 2A at a time T2 according to some implementations of the present disclosure. Specifically, at time T2 (e.g., an instance/period of time that occurs subsequent to time T1), after receiving the audio data 214 from participant computing device 204, and audio data 226 from participant computing devices 220 via the transmissions 213, the teleconference computing system can mix audio data 214 and audio data 226 to form mixed audio data 228. The mixed audio data 228 can include mixed audio 229, which can be a mix of the audio 211, the audio 215, and the audio 227. The teleconference computing system 205 can provide a broadcast 230 that includes the mixed audio data 228 to the participant computing devices connected to the teleconferencing session (e.g., devices 202, 204, 220, etc.).

It should be noted that, generally, the mixed audio data 228 does not include data (e.g., metadata, etc.) that identifies which portions of the mixed audio 229 correspond to specific audio (e.g., audio 214, etc.). As such, it can be prohibitively difficult to determine the location from which any particular portion of the mixed audio 229 originates. For example, if a portion of the mixed audio 229 includes the audio 214 captured at the participant computing device 204, it would be prohibitively difficult to for the participant computing device 202 to determine whether that portion of the mixed audio data 228 originated from the participant computing device 204 or one of the participant computing devices 220.

Based on the reception of the mixed audio data 228 (e.g., at time T2) subsequent to the capture of the audio data 210 (e.g., at time T1), the participant device 202 can receive the broadcast 230 that includes the mixed audio data 228. The participant computing device 202 can utilize the co-location determinator 232 to make an initial determination of similarities, or shared features, between the audio 211 and the portion (or more) of the mixed audio data 228. Based on the similarities/features, and the reception of the second audio data subsequent to the capture of the audio data, the participant computing device 202 can make the determination that the portion of the mixed audio 229 (or more) originates from the audio source 206 co-located with the participant computing device 202. Identifying similarities and/or features between audio will be discussed in greater detail with regards to FIG. 5.

More specifically, as depicted in FIG. 2A, the audio produced by audio source 206 is captured by participant devices 202 and 204 at time T1. Once captured, the participant device 204 encodes the audio data 214 and transmits the audio data 214 to the teleconferencing computing system 205, where the audio data 214 is mixed with audio data 226 and broadcast as mixed audio data 228 to the participant device 202. However, transmitting, encoding, mixing, and broadcasting audio data takes time, and as such, the participant device A does not receive the broadcast of the mixed audio data 228 until the time T2 which occurs after time T1. As such, if the mixed audio data 228 is received by the participant computing device 202 prior to time T1, rather than after time T1 (i.e., time T2), then the participant computing device 202 can make a determination that the mixed audio 229 and the audio 211 do not originate from the same audio source.

As such, in some implementations, the participant computing device verifies that the mixed audio data 228 is received subsequent to the capture of audio data 210. For example, the co-location determinator 232 can record, or receive, chronological data 233. Chronological data 233 can include a timestamp that indicates a precise time at which the audio data 211 is received (e.g., 00.000 seconds) and a precise time at which the mixed audio data 228 is received (e.g., 01.392 seconds). Based on the chronological data, the participant computing device 202 can make the determination that portion (or more) of the mixed audio data 228 originates from the audio source 206 co-located with the participant computing device 202.

Based on the determination, the participant computing device 202 can generate co-location information 234 indicating that the participant computing device is co-located with some other participant computing device connected to the teleconferencing session.

As described previously however, although the participant computing device 202 can make the determination that the portion of the mixed audio 229 originates from the same audio source 206 as the audio 211, it can be prohibitively difficult for the participant computing device 202 to determine which other participant computing device captured the portion of the mixed audio. As such, in some implementations, the co-location information does not indicate which of the other participant computing devices the participant device 202 is co-located with.

However, in some other implementations, the teleconference computing system 205 can separately broadcast audio data from the participant devices 204 and 220 without mixing the audio for broadcast. For example, the teleconference computing system 205 can separately broadcast audio data B, C, and N to the participant computing device 202. The audio data, upon receipt of the broadcast, can indicate a source from which the audio data originated. For example, the audio data 214, when separately broadcast to the participant computing device 202, can indicate that it originated from the participant device 204. In such fashion, the participant computing device 202 can concurrently detect co-location with another device and also identify the participant computing device 204 as the device with which it is co-located with. The participant computing device 202 can indicate the identity of the co-located device (e.g., participant computing device 204) to the teleconference computing system 205 in the co-location information 234.

Figure 3:
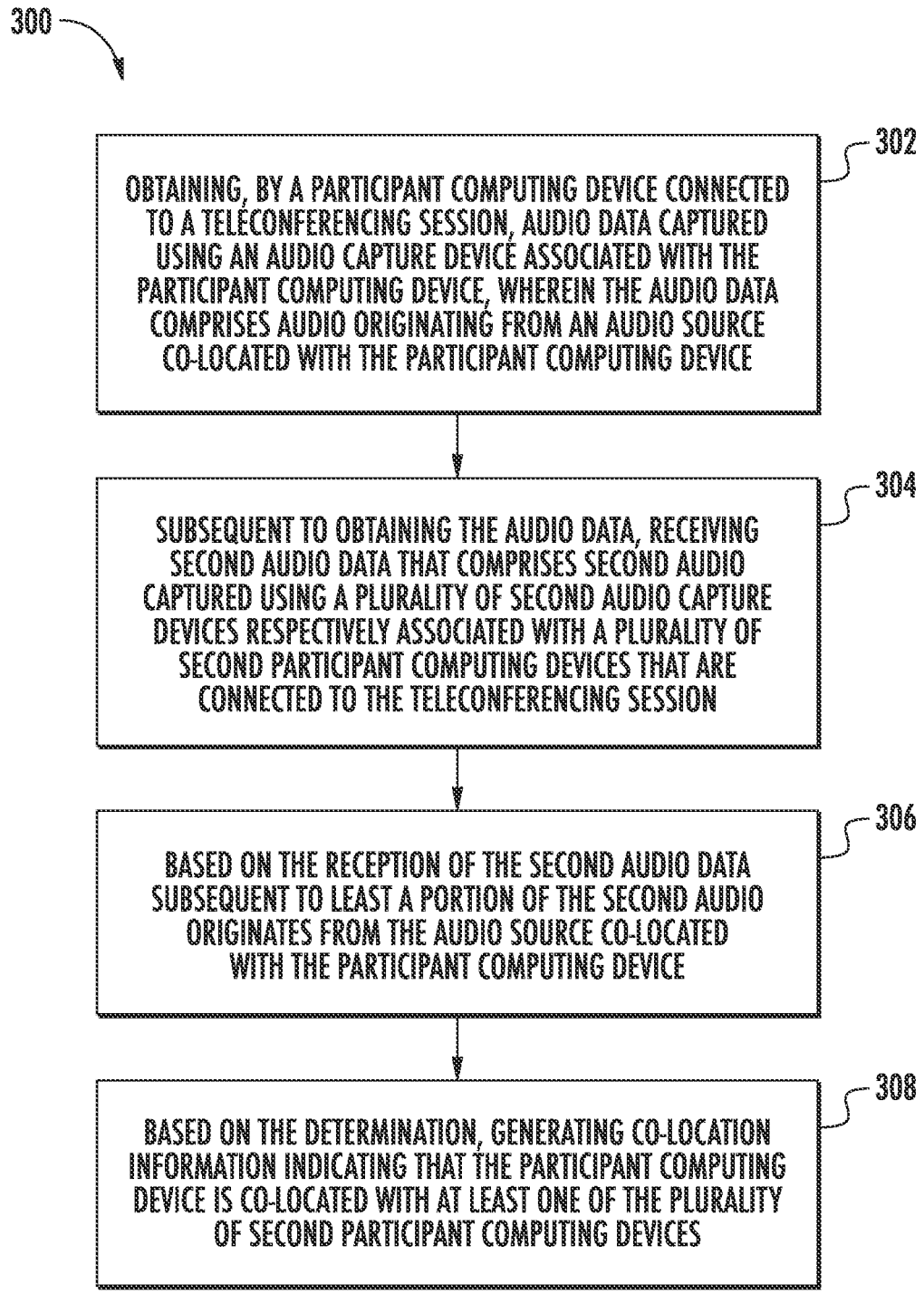
FIG. 3 is a flow diagram of an example method perform efficient detection of co-located devices in a teleconferencing session, in accordance with some embodiments of the present disclosure.

FIG. 3 is a flow diagram of an example method 300 perform efficient detection of co-located devices in a teleconferencing session, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the co-location determinator 118 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible The operations described herein can be performed by a participant computing device. As referred to herein, a participant computing device generally refers to any device that can be utilized by a participant (e.g., a user that is participating in the teleconferencing session) to connect to a teleconferencing session for the purposes of exchanging communication data (e.g., a smartphone, laptop computer, desktop computer, AR/VR headset, wearable device, purpose-built teleconferencing device, etc.). Any computing system(s) or computing device(s) will be discussed in greater detail with regards to participant computing device 602 and teleconference computing system 650 of FIG. 6.

The computing system can be connected to a teleconferencing session. A teleconferencing "session" can refer to an active and ongoing session of a teleconference to which multiple computing devices and/or systems are connected and exchanging real-time communication data. A teleconference, as used herein, generally refers to any exchange of communication data (e.g., audio data, video data, AR/VR data, etc.) between multiple computing devices. The term "teleconference" can encompass videoconferences, audioconferences, media conferences (e.g., exchanging multiple types of communication data), an Augmented Reality (AR)/Virtual Reality (VR) conference, and/or other forms of the exchange of data (e.g., communications data) between participant computing devices.

At operation 302, processing logic of a participant computing device connected to a teleconferencing session can obtain audio data (i.e., an audio "signal", etc.) captured using an audio capture device (e.g., a microphone, etc.) associated with the participant computing device. Audio data can refer to any type or manner of signal or data that includes, or represents, audio captured at the audio capture device. The audio data can include audio originating from an audio source co-located with the participant computing device. The audio source (e.g., an audio output device, a participant, ambient noise, etc.) can be considered "co-located" with the participant computing device if the audio source is located within a relatively close distance of the participant computing device, and/or if audio produced by the audio source is close enough to be captured by the associated audio capture device.

For example, the participant computing device can be a laptop with a built-in audio capture device (e.g., a microphone). The audio source can be a participant that is holding the laptop as they walk into a room occupied by another participant holding their own participant computing device (e.g., a smartphone, etc.). The participant holding the laptop can produce audio (e.g., a spoken utterance, a cough, a breath, etc.), and the audio can be captured as audio data by the audio capture device. For another example, the participant computing device can be a desktop computer, and the audio capture device can be a wireless headset worn by a participant and communicatively coupled to the desktop computer. The audio source can be a background noise (e.g., a truck driving by, a dog barking, a knock at the door of the participant, etc.).

In some implementations, the audio source can be considered indirectly co-located with the participant computing device due to the audio source's proximity to the audio capture device associated with the participant computing device. For example, the participant computing device can be a smartphone device, and the audio capture device can be a microphone located in a set of wireless earbuds worn by the participant that are wirelessly connected to the participant computing device. As the participant is wearing the wireless earbuds (i.e., the audio capture device), even if the participant walks away from the smartphone, the participant is still considered to be co-located with the smartphone due to the wireless connection between the wireless earbuds and the smartphone. More generally, it should be broadly understood that co-location of the audio source and the audio capture device (e.g., the audio capture device can capture audio produced by the audio source) is sufficient to establish co-location with the participant computing device. Alternatively, in some implementations, co-location may instead be established between the audio source and the audio capture device without regard for the location of the participant computing device.

At operation 304, subsequent to (i.e., after) obtaining the audio data, the processing logic of the participant computing device can receive second audio data that includes second audio captured using a plurality of second audio capture devices respectively associated with the second participant computing devices. In particular, it should be noted that the second audio can be audio from a number of sources that is mixed to collectively form the second audio. More generally, as described with regards to the mixed audio data 228 of FIG. 2, the second audio data can include second audio captured locally at any, or all, of the plurality of second participant computing devices.

In some implementations, the plurality of second audio capture devices can be a single second audio capture device. For example, the second audio capture devices can be a single microphone that records audio from multiple participants.

For example, one of the second participant computing devices can capture audio data that includes audio produced by a can falling off a desk. Another of the second participant computing devices can capture audio produced by a spoken utterance from the participant that is using the device. Both of the second participant computing devices can send the captured audio data to a teleconference computing system that is hosting, or otherwise orchestrating, the teleconferencing session (e.g., a teleconference computing system). The teleconference computing system can mix the audio of the can falling off of the desk and the spoken utterance from the participant, and can broadcast the mixed audio as the second audio data.

At operation 306, the processing logic of the participant computing device can, based on the reception of the second audio data subsequent to the capture of the audio data, make a determination that at least a portion of the second audio originates from the audio source co-located with the participant computing device. More specifically, as described with regards to the mixed audio data 228 of FIG. 2, once audio data from multiple participant computing devices is mixed together, it is prohibitively difficult to determine the participant computing device from which a particular sound, or portion, of the mixed audio originated from. However, although the participant computing device cannot always determine co-location with a specific second participant computing device, it can identify similarities between certain portions of the audio data and the second audio data.

To follow the example illustrated in FIG. 1, the audio source can be a participant that produces a spoken utterance of the word "Elephant". The audio produced by the participant can be captured by the audio capture device, and can also be inadvertently captured by a second audio capture device of a second participant computing device. A spoken utterance of the word "Elephant" can form distinct features in the audio data that can be identified. As such, the participant computing device can identify similarities or features (e.g., spectral peaks in a spectrogram, etc.) between the audio data and the portion of the second audio data from the second participant computing device that inadvertently captured the spoken utterance. Determining such similarities, or features, will be discussed in greater detail with regards to FIG. 5.

Importantly, the participant computing device can make this initial determination of similarities, or shared features, between the audio data and the portion (or more) of the second audio data. However, the participant computing device makes the determination that that the portion (or more) of the second audio originates from the audio source co-located with the participant computing device based on the reception of the second audio data subsequent to the capture of the audio data.

More specifically, as described with regards to FIGS. 2A/2B, the audio data is captured at a first time by the participant computing device and the co-located second participant computing device(s) (e.g., concurrent capture of a spoken utterance from a participant, etc.). The second participant computing device(s) can transmit the second audio data to a teleconference computing system, where it is mixed and broadcast to the participant computing device. Transmitting, mixing, and broadcasting the second audio data necessarily takes time (e.g., 100 milliseconds, 400 milliseconds etc.), and as such, if the participant computing device does not receive the second audio data subsequent to capture of the audio data, the devices necessarily cannot be co-located, and the similarities between the audio data and the second audio data are caused by some other phenomenon (e.g., echo, watching the same TV show in the background, etc.). Thus, the participant computing device makes the determination that both audio data includes audio originating from the same audio source based on the reception of the second audio data subsequent to the capture of the audio data.

At operation 308, based on the determination, the processing logic of the participant computing device can generate co-location information indicating that the participant computing device is co-located with at least one of the plurality of second participant computing devices. The colocation information can be any type or manner of data sufficient to indicate co-location between the participant computing device and the second participant computing device(s). For example, the co-location information may be an audio signal to be played at audio output devices connected to the participant computing device. Once played, the audio signal can inform any receiving devices of possible co-location (i.e., e.g., an encoded audio signal that can indicate co-location to devices within an audible range of the participant computing device).

For another example, the co-location information can be a data packet, or the like, that, once provided to the teleconference computing system (e.g., the system orchestrating the teleconferencing session), indicates to the teleconference computing system that the participant computing device is co-located with some other device connected to the teleconferencing session. This can allow the teleconference computing system to take a preventative action (e.g., temporarily removing audio data received from the participant computing device from subsequent audio data broadcasts, identifying which of the second participant devices is co-located with the participant computing device, etc.). For example, the teleconference computing system may modify future broadcasts so that co-located devices do not receive audio broadcasts from each other.

In some implementations, the participant computing device can receive preliminary co-location information along with the second audio data. The preliminary co-location information can indicate that some other participant computing device in the teleconferencing session is co-located with another device. The participant computing device can generate the co-location information based on the preliminary co-location information and the determination. Transmission, and reception, of preliminary co-location information will be discussed in greater detail with regards to FIG. 4.

Figure 4:
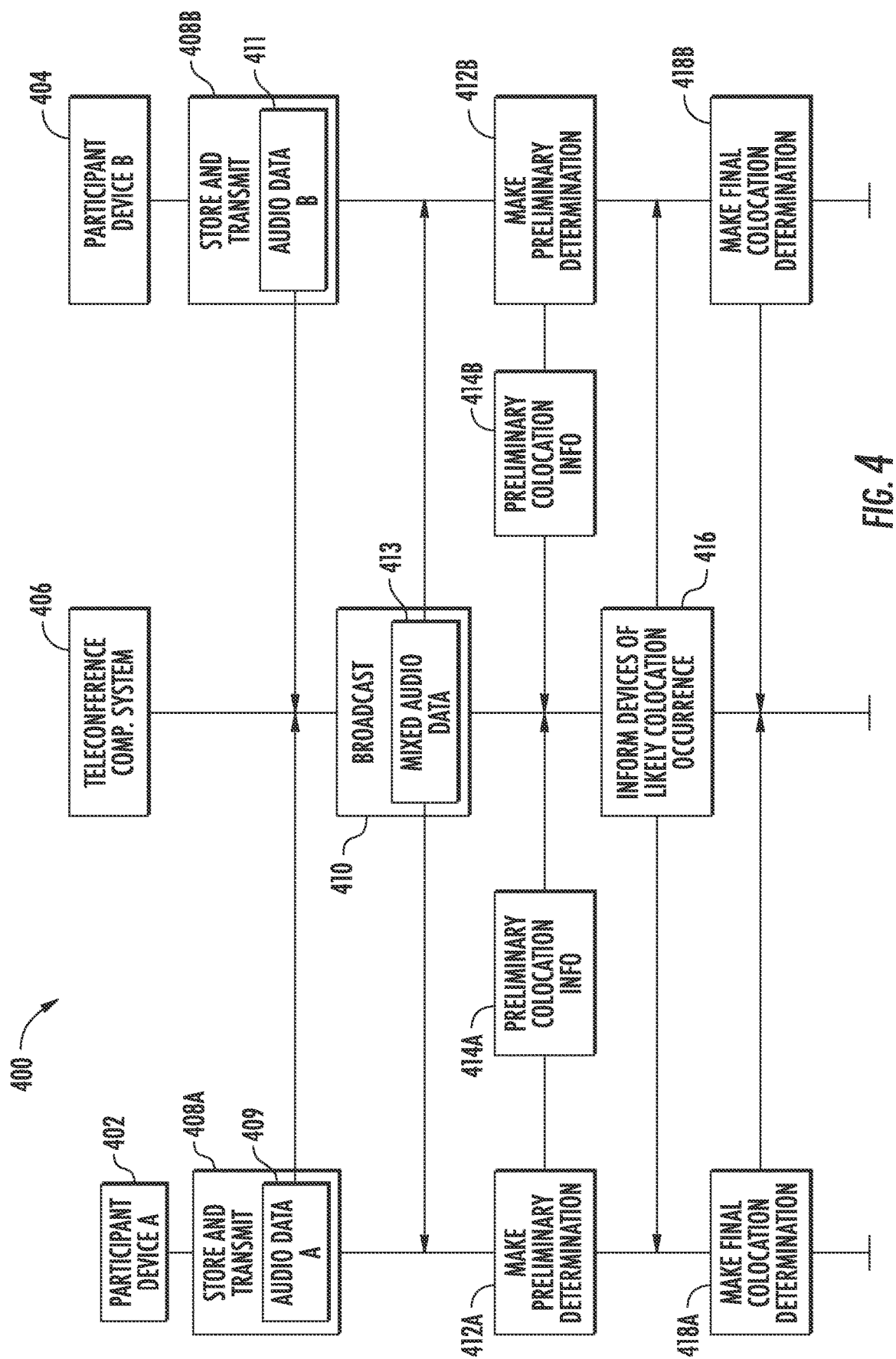
FIG. 4 is a communication flow diagram for verifying co-location based on transmission and reception of preliminary co-location information according to some implementations of the present disclosure.

FIG. 4 is a communication flow diagram 400 for verifying co-location based on transmission and reception of preliminary co-location information according to some implementations of the present disclosure. In particular, at 408A the participant device 402 can store captured audio data 409 and transmit the audio data 409 to the teleconference computing system 406 as described with regards to FIGS. 1 and 2A/2B. Similarly, at 408B, the participant computing device 404 can store and transmit audio data 411 to the teleconference computing system 406.

At 410 the teleconference computing system 406 can broadcast mixed audio data 413 to the participant device 402 and participant device 404. At 412A, the participant device 402 can make a preliminary determination of the occurrence of similarities/features in both the audio data 409 and the mixed audio data 413. The participant device can provide preliminary co-location information 414A to the teleconference computing system 406 indicating that the participant computing device 402 may be co-located within another participant computing device connected to the teleconferencing session orchestrated by the teleconference computing system 406. The participant device 404 can make a similar preliminary determination at 412B, and can also provide preliminary co-location information 414B to the teleconference computing system 406.

At 414, the teleconference computing system 406 can receive the preliminary co-location information 414A/414B. As the teleconference computing system 406 has received two sets of preliminary co-location information, the teleconference computing system 406 can determine it is likely that co-location has occurred. The teleconference computing system 406 can provide information 416 that indicates to the participant devices 402 and 404 that the occurrence of co-location is likely. However, if the teleconference computing system 406 only receives preliminary co-location information 414A, and not 414B (or vice-versa), the teleconference computing system 406 can inform the participant computing device that provided the preliminary co-location information that their preliminary determination is likely incorrect.

For example, assume that the teleconference computing system 406A only receives preliminary co-location information 414A from participant device 402, and does not receive any preliminary co-location information from participant device 404. If the participant device 402 was co-located with participant device 404, then the audio data 409 and audio data 411 would include audio from the same audio source and the preliminary determinations 412A/412B made by the participant devices 402/404 would be likely to have the same outcome as the preliminary (e.g., identifying similarities/features between audio data 409/411 and mixed audio data 413). As such, the teleconference computing system 406 can determine that co-location is unlikely to have occurred, and that the participant device 402's preliminary determination at 412A is likely incorrect.

In some implementations, the teleconference computing system 406 can determine which participant computing devices are likely to be co-located. For example, if the teleconference computing system 406 receives preliminary co-location information from participant computing devices 402 and 404, but does not receive preliminary co-location information from any other participant computing device connected to the teleconferencing session, the teleconference computing system 406 can determine that the two participant computing devices 402 and 404 are co-located. Conversely, if the teleconference computing system 406 receives preliminary co-location information from participant devices 402, 404, and a three other participant computing devices connected to the teleconferencing session, it is unlikely that the teleconference computing system 406 can determine which of the participant computing devices are co-located.

Based on the information indicating that co-location is likely received from the teleconference computing system 406, the participant computing devices 402 and 404 can make final determinations 418A/418B that co-location has occurred. Based on the final determination, the participant computing devices 402 and 404 can take corrective action(s). For example, the participant computing device 402 may indicate on a connected display device (e.g., within a depicted teleconference application interface) that co-location has occurred and that the participant should move away from any other participants. For another example, the participant computing device 402 may temporarily mute the associated audio capture device to eliminate any audio feedback loop that could arise from the co-location. For yet another example, the participant computing device 402 may locally modify the mixed audio data 413 before playback to suppress the portion of the audio that is identified as being similar to the audio data 409.

It should be noted that, although implementations of the present disclosure are discussed primarily within the context of mixed audio transmissions. However, implementations of the present disclosure can also be effectively applied to the transmission of separate audio data. More specifically, rather than receiving a transmission of mixed audio from a teleconference computing system that includes a mix of audio data from multiple participant computing devices, a participant computing device can receive each audio data separately without mixing at the teleconference computing system.

When separately receiving the audio data for each other participant computing device, the participant computing device can utilize aspects of the present disclosure to determine an identity of the co-located device. For example, at 410, the teleconference computing system 406 broadcasts mixed audio data 413 which includes a mix of audio data 411 and audio data from other participant computing devices. However, in some implementations, the teleconference computing system 406 can separately broadcast transmissions received from some participant computing device to other participant computing devices. For example, the teleconference computing system 406 can receive the audio data 411 from participant device 404, and can receive another transmission of audio data from another participant computing device (i.e., a "participant computing device C"). In this case, the teleconference computing system 406 can separately transmit the audio data 411 and the audio data from the other participant computing device to the participant device 402, while indicating the participant computing device from which the audio data originated.

In such implementations, when making a determination of co-location (e.g., final co-location determination 418A), the participant computing device 402 can also identify the device with which it is co-located. More specifically, assume that the teleconference computing system 406 separately broadcasts audio data 411 to the participant computing device 402A without mixing the audio data 411. The broadcast 410 from the teleconference computing system 406 can indicate to the participant computing device 402 that the audio data 4111 originates from the participant computing device 404. Accordingly, if the participant computing device 402 makes a final co-location determination based on the audio data 411, the participant computing device 402 can determine that it is co-located with the participant computing device 404. In such fashion, implementations of the present disclosure can both detect the presence of co-located devices, and determine the identity of co-located devices, when audio data is not mixed by the teleconference computing system 406.

Figure 5:
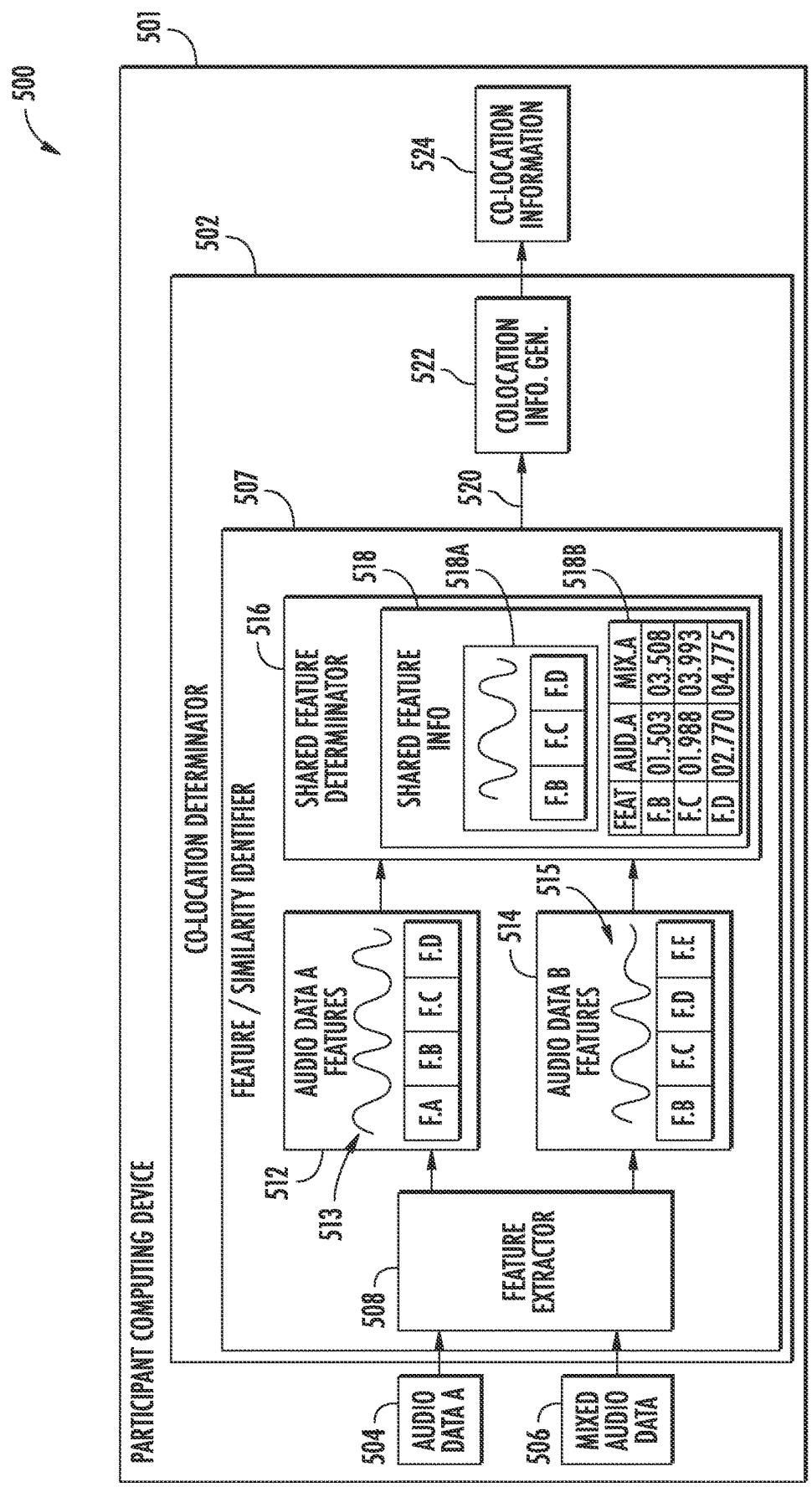
FIG. 5 is a block diagram for a co-location determinator that identifies shared similarities and/or features in captured audio according to some implementations of the present disclosure.

FIG. 5 is a block diagram 500 for a co-location determinator 502 that identifies shared similarities and/or features in captured audio according to some implementations of the present disclosure. Co-location determinator 502 can be, or otherwise include, any type or manner of hardware and/or units of software instructions sufficient to determine the occurrence of co-location between participant computing devices. In particular, the co-location determinator 502 can be a software module executed using various device(s) (e.g., processor devices, memory devices, storage, etc.) of participant computing device 501.

More specifically, participant computing device 501 can obtain audio data 504 and mixed audio data 506. As described with regards to FIGS. 1, 2A, and 2B, the audio data 504 can include audio from an audio source co-located with the participant computing device 501, and the mixed audio data 506 can include audio from the same audio source that is captured inadvertently. The mixed audio data 506 can also include audio data from other participant computing devices.

The co-location determinator 502 can include feature/similarity identifier 507. The feature/similarity identifier 507 can be a module, or submodule, that processes audio data 504 and mixed audio data 506 to make a decision that at least a portion of the mixed audio data 506 originates from an audio source co-located with the participant computing device 501.

The feature/similarity identifier 507 can include a feature extractor 508. The feature extractor 508 can process the audio data 504 to obtain audio data features 510. The feature extractor 508 can also process the mixed audio data 506 to obtain audio data features 512. In some implementations, to extract features, the feature extractor 508 can generate audio data features 512 and the audio data features 514. Audio features 512 can include a spectrogram 513, and audio data features 514 can include a spectrogram 515. The spectrograms 513 and 515 can both include a number of spectral, and the occurrence of two spectral peaks can form a feature. To follow the depicted example, the spectrogram 513 can include pairs of spectral peaks that collectively form features A, B, C, and D. Similarly, the spectrogram 515 can include pairs of spectral peaks that collectively form features B, C, D, and E.

Alternatively, in some implementations, the feature extractor may extract, or otherwise identify, some other type of feature to represent similarities between the audio of the audio data 504 and mixed audio data 506. More generally, the features extracted can be any type of time-domain or frequency-domain features.

The feature/similarity identifier 507 can include a shared feature determinator 516. The shared feature determinator 516 can process the audio data features 512 and the audio data features 514 (and/or the spectrograms 513 and 515) to determine shared feature information 518. The shared feature information 518 can indicate features that occur in both the audio data features 512 and the audio data features 514. To follow the depicted example, the audio data features 512 can include features A, B, C, and D, and audio data features 514 can include features B, C, D, and E. The shared feature information 518 can identify that features B, C, and D are shared between the audio data features 512 and 514. For example, the shared feature information 518 can include a spectrogram 518A that indicates the shared pairs of spectral peaks that collectively form features B, C, and D.

Additionally, in some implementations, the shared feature information can include feature chronological information 518B. The feature chronological information 518B can indicate a time at which each feature appears in the audio data 504 and mixed audio data 506. As discussed previously with regards to the chronological data 233 of FIG. 2B, if the audio associated with audio feature data 514 is captured at a participant computing device co-located with the participant computing device 501, then the features of mixed audio data 506 will necessarily occur in the audio feature data 514 at a time subsequent to a time at which the features appear in the audio data features 512.

To follow the depicted example, the shared feature information can indicate that features B, C, and D are shared between the audio data 504 and mixed audio data 506. The feature chronological information 518B can indicate that feature B occurs at time 01.503 in audio data 504, and at time 03.508 in mixed audio data 506. As such, the feature chronological information 518B can indicate that the shared features of mixed audio data 506 correctly occur at a time subsequent to a time at which the same shared features occur in the audio data 504.

Based on the shared feature information 518, the feature/similarity identifier 507 can make a decision 520 that at least a portion of the audio of the mixed audio data 506 originates from an audio source co-located with the participant computing device 501. Based on decision 520, co-location information generator 522 can generate co-location information 524. In such fashion, the participant computing device 501 can leverage the co-location determinator to efficiently detect the co-location of the participant computing device 501 with any other participant computing devices connected to a common teleconferencing session.

Figure 6:
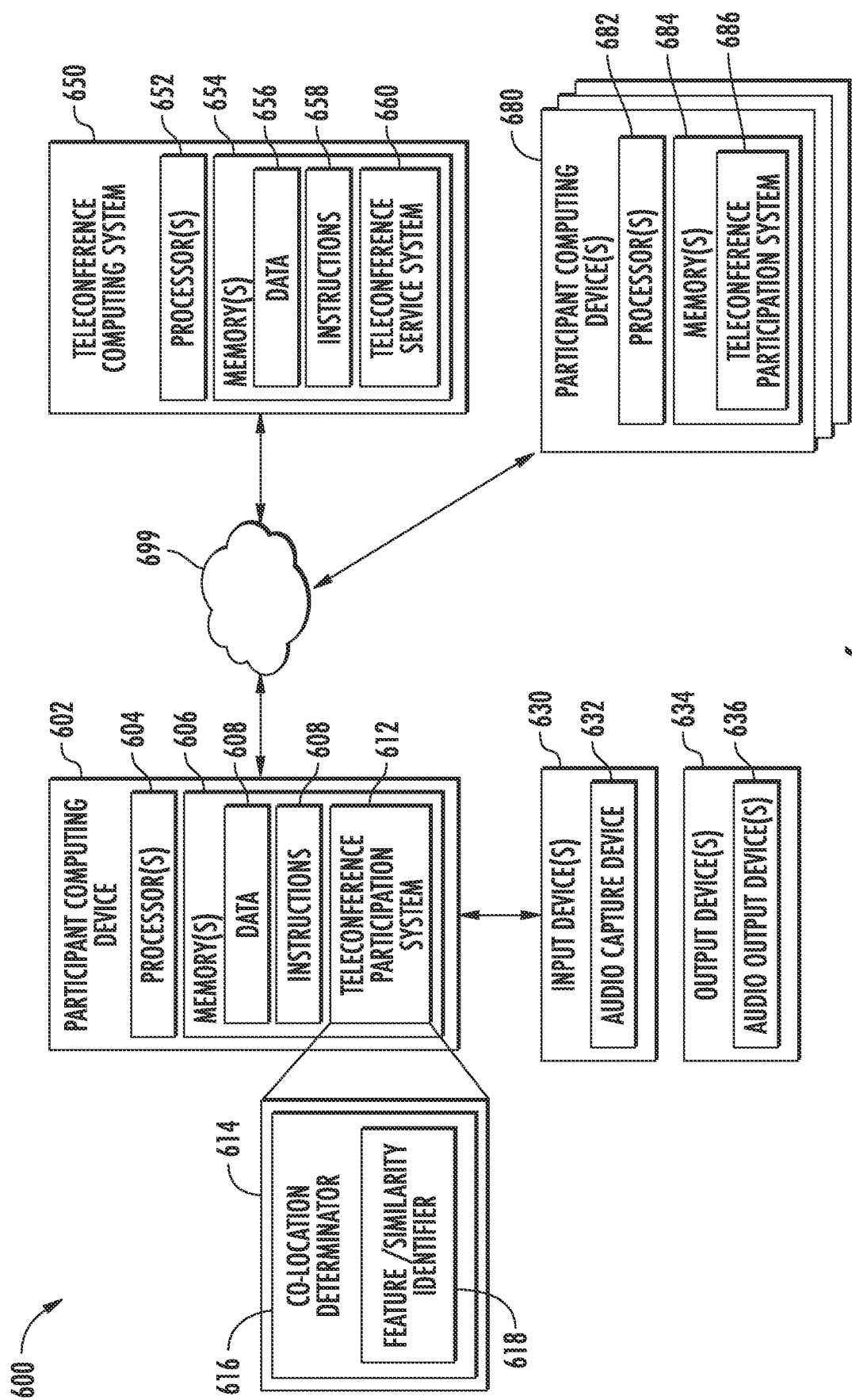
FIG. 6 depicts a block diagram of an example computing environment that performs efficient detection of co-located participant devices in teleconferencing sessions. according to example implementations of the present disclosure.

FIG. 6 depicts a block diagram of an example computing environment 600 that performs efficient detection of co-located participant devices in teleconferencing sessions. according to example implementations of the present disclosure. The computing environment 600 includes a participant computing device 602 that is associated with a participant in a teleconference, a teleconference computing system 650, and, in some implementations, other participant computing device(s) 680 respectively associated with other participants(s) in the teleconference.

The participant computing device 602 can be any type of computing device, such as, for example, a personal computing device (e.g., laptop or desktop), a mobile computing device (e.g., smartphone or tablet), a gaming console or controller, a wearable computing device (e.g., a virtual/augmented reality device, etc.), an embedded computing device, a broadcasting computing device (e.g., a webcam, etc.), etc.

The participant computing device 602 includes processor(s) 604 and memory(s) 606. The processor(s) 604 can be any suitable processing device (e.g., a processor core, a microprocessor, an ASIC, an FPGA, a controller, a microcontroller, etc.) and can be one processor or processors that are operatively connected. The memory 606 can include non-transitory computer-readable storage media(s), such as RAM, ROM, EEPROM, EPROM, flash memory devices, magnetic disks, etc., and combinations thereof. The memory 606 can store data 608 and instructions 610 which are executed by the processor 604 to cause the participant computing device 602 to perform operations.

Specifically, the memory 606 of the participant computing device 602 can include a teleconference participation system 612. The teleconference participation system 612 can facilitate participation in a teleconference by a participant associated with the participant computing device 602 (e.g., a teleconference hosted or otherwise orchestrated by teleconference computing system 650, etc.). To facilitate teleconference participation, the teleconference participation system 612 can include service module(s) 614 which, by providing various services, can collectively facilitate participation in a teleconference.

For example, the teleconference service module(s) 614 can include co-location determinator module 616. The co-location determinator module 616 can be the co-location determinator described with regards to FIG. 5. More specifically, the co-location determinator module 616 can process audio data to determine whether the participant computing device 602 is co-located with any other participant computing devices that are connected to the same teleconferencing session as that of the participant computing device 602. In some implementations, the co-location determinator module 616 can include a feature/similarity identifier module 618. The feature/similarity identifier module 618 can determine features and/or similarities that are shared between two sets of audio data as described with regards to FIG. 5.

In some implementations, the feature/similarity identifier module 618, and/or the co-location determinator module 616, can be implemented as machine-learned model(s). For example, the co-location determinator module 616 can be a machine-learned co-location detection model that is trained to detect the co-location of participant computing devices. The machine-learned co-location detection model can be a model trained to process audio captured at the participant computing device 602 alongside mixed audio (e.g., broadcast from teleconference computing system 650) to identify any co-located devices. In some implementations, the feature/similarity identifier module 618 can be implemented as a submodel (e.g., a submodel of the machine-learned co-location detection model that implements the co-location determinator module 616). For example, the feature/similarity identifier module 618 can be implemented as a machine-learned feature identification submodel. The machine-learned feature identification submodel can be a model trained to identify shared features and/or similarities between sets of audio data. Alternatively, the machine-learned feature identification submodel can be a model trained to generate intermediate representations of audio data that identify features in the audio data (e.g., spectrograms, etc.).

The participant computing device 602 can also include input device(s) 630 that receive inputs from a participant, or otherwise capture data associated with a participant. For example, the input device(s) 630 can include a touch-sensitive device (e.g., a touch-sensitive display screen or a touch pad) that is sensitive to the touch of a participant input object (e.g., a finger or a stylus). The touch-sensitive device can serve to implement a virtual keyboard. Other example participant input components include a microphone, a traditional keyboard, or other means by which a participant can provide user input.

In some implementations, the participant computing device 602 can include, or can be communicatively coupled to, input device(s) 630. For example, the input device(s) 630 can include a camera device that can capture two-dimensional video data of a participant associated with the participant computing device 602 (e.g., for broadcasting, etc.).

In some implementations, the input device(s) 630 can include a number of camera devices communicatively coupled to the participant computing device 602 that are configured to capture image data from different perspectives for generation of three-dimensional pose data/representations (e.g., a representation of a user of the participant computing device 602, etc.).

In some implementations, the input device(s) 630 can include sensor devices configured to capture sensor data indicative of movements of a participant associated with the participant computing device 602 (e.g., accelerometer(s), Global Positioning Satellite (GPS) sensor(s), gyroscope(s), infrared sensor(s), head tracking sensor(s) such as magnetic capture system(s), an omni-directional treadmill device, sensor(s) configured to track eye movements of the user, etc.).

In particular, the input device(s) 630 can include audio capture devices 632, such as microphones. For example, the audio capture device(s) 632 can be, or otherwise include, a microphone array that captures high-quality audio data and provides the data as an audio input signal. For another example, the audio capture device(s) 632 can be a directional microphone that captures audio and a direction from which the audio was captured.

In some implementations, the participant computing device 602 can include, or be communicatively coupled to, output device(s) 634. Output device(s) 634 can be, or otherwise include, device(s) configured to output audio data, image data, video data, etc. For example, the output device(s) 634 can include a two-dimensional display device (e.g., a television, projector, smartphone display device, etc.). For another example, the output device(s) 634 can include display devices for an augmented reality device or virtual reality device.

In particular, the output device(s) 634 can include audio output device(s) 636. The audio output device(s) 636 can be any type or manner of audio device that can create, or otherwise simulate, stereo audio. For example, the audio output device(s) 636 can be a wearable audio output device (e.g., wired or wireless headphones, earbuds, bone conduction headphones, portable stereo simulation speakers, etc.). For another example, the audio output device(s) 636 can be multiple discrete audio output devices within a single audio output device (e.g., a soundbar device that simulates stereo audio). For yet another example, the audio output device(s) 636 can be separate audio output devices that produce stereo audio (e.g., multiple networked passive speakers, a wireless mesh speaker setup, etc.).

The teleconference computing system 650 includes processor(s) 652 and a memory 654. The processor(s) 652 can be any suitable processing device (e.g., a processor core, a microprocessor, an ASIC, an FPGA, a controller, a microcontroller, etc.) and can be one processor or processors that are operatively connected. The memory 654 can include non-transitory computer-readable storage media(s), such as RAM, ROM, EEPROM, EPROM, flash memory devices, magnetic disks, etc., and combinations thereof. The memory 654 can store data 656 and instructions 658 which are executed by the processor 652 to cause the teleconference computing system 650 to perform operations.

It should be noted that the teleconference computing system 650 is discussed with regards to implementation, hosting, orchestration, etc. of a teleconference. However, a teleconference session refers to a specific occurrence of a teleconference in which multiple participants exchange communication data. As such, any discussion of the teleconference computing system 650 with regards to a teleconference (e.g., hosting a teleconference, orchestrating a teleconference, etc.) is also applicable to a teleconferencing session.

In some implementations, the teleconference computing system 650 can be, or otherwise include, a virtual machine or containerized unit of software instructions executed within a virtualized cloud computing environment (e.g., a distributed, networked collection of processing devices), and can be instantiated on request (e.g., in response to a request to initiate a teleconference, etc.). Additionally, or alternatively, in some implementations, the teleconference computing system 650 can be, or otherwise include, physical processing devices, such as processing nodes within a cloud computing network (e.g., nodes of physical hardware resources).

The teleconference computing system 650 can facilitate the exchange of communication data within a teleconference using the teleconference service system 660. More specifically, the teleconference computing system 650 can utilize the teleconference service system 660 to encode, broadcast, and/or relay communications signals (e.g., audio input signals, video input signals, etc.), host chat rooms, relay teleconference invites, provide web applications for participation in a teleconference (e.g., a web application accessible via a web browser at a teleconference computing system, etc.), etc.

More generally, the teleconference computing system 650 can utilize the teleconference service system 660 to handle any frontend or backend services directed to providing a teleconference. For example, the teleconference service system 660 can receive and broadcast (i.e., relay) data (e.g., video data, audio data, etc.) between the participant computing device 602 and participant computing device(s) 680. For another example, the teleconference service system 660 can facilitate direct communications between the participant computing device 602 and participant computing device(s) 680 (e.g., peer-to-peer communications, etc.). A teleconferencing service can be any type of application or service that receives and broadcasts data from multiple participants. For example, in some implementations, the teleconferencing service can be a videoconferencing service that receives data (e.g., audio data, video data, both audio and video data, etc.) from some participants and broadcasts the data to other participants.

As an example, the teleconference service system 660 can provide a videoconference service for multiple participants. One of the participants can transmit audio and video data to the teleconference service system 660 using a participant device (e.g., participant computing device 602, etc.). A different participant can transmit audio data to the teleconference service system 660 with a different participant computing device. The teleconference service system 660 can receive the data from the participants and broadcast the data to each computing system.

As another example, the teleconference service system 660 can implement an augmented reality (AR) or virtual reality (VR) conferencing service for multiple participants. One of the participants can transmit AR/VR data sufficient to generate a three-dimensional representation of the participant to the teleconference service system 660 via a device (e.g., video data, audio data, sensor data indicative of a pose and/or movement of a participant, etc.). The teleconference service system 660 can transmit the AR/VR data to devices of the other participants. In such fashion, the teleconference service system 660 can facilitate any type or manner of teleconferencing services to multiple participants.

It should be noted that the teleconference service system 660 can facilitate the flow of data between participants (e.g., participant computing device 602, participant computing device(s) 680, etc.) in any manner that is sufficient to implement the teleconference service. In some implementations, the teleconference service system 660 can be configured to receive data from participants, decode the data, encode the data, broadcast the data to other participants, etc. For example, the teleconference service system 660 can receive encoded video data from the participant computing device 602. The teleconference service system 660 can decode the video data according to a video codec utilized by the participant computing device 602. The teleconference service system 660 can encode the video data with a video codec and broadcast the data to participant computing devices.

In particular, the teleconference computing system 650 can mix audio received from multiple participant computing devices. For example, the teleconference computing system 650 can receive audio data from participant computing device 602 and from each of the participant computing device(s) 680. The teleconference computing system 650 can decode the audio data, mix the audio included in the audio data, and broadcast the mixed audio data to the participant computing device 602 and each of the participant computing device(s) 680. In such fashion, the teleconference computing system 650 can facilitate the live exchange of audio data and other communication data within a teleconferencing session.

In some implementations, the teleconference computing system 650 includes, or is otherwise implemented by, server computing device(s). In instances in which the teleconference computing system 650 includes multiple server computing devices, such server computing devices can operate according to sequential computing architectures, parallel computing architectures, or some combination thereof.

In some implementations, the transmission and reception of data by teleconference computing system 650 can be accomplished via the network 699. For example, in some implementations, the participant computing device 602 can capture video data, audio data, multimedia data (e.g., video data and audio data, etc.), sensor data, etc. and transmit the data to the teleconference computing system 650. The teleconference computing system 650 can receive the data via the network 699.

In some implementations, the teleconference computing system 650 can receive data from the participant computing device(s) 602 and 680 according to various encryption scheme(s) (e.g., codec(s), lossy compression scheme(s), lossless compression scheme(s), etc.). For example, the participant computing device 602 can encode audio data with an audio codec, and then transmit the encoded audio data to the teleconference computing system 650. The teleconference computing system 650 can decode the encoded audio data with the audio codec. In some implementations, the participant computing device 602 can dynamically select between a number of different codecs with varying degrees of loss based on conditions (e.g., available network bandwidth, accessibility of hardware/software resources, etc.) of the network 699, the participant computing device 602, and/or the teleconference computing system 650. For example, the participant computing device 602 can dynamically switch from audio data transmission according to a lossy encoding scheme to audio data transmission according to a lossless encoding scheme based on a signal strength between the participant computing device 602 and the network 699.

The teleconference computing system 650 and the participant computing device 602 can communicate with the participant computing device(s) 680 via the network 699. The participant computing device(s) 680 can be any type of computing device(s), such as, for example, a personal computing device (e.g., laptop or desktop), a mobile computing device (e.g., smartphone or tablet), a gaming console or controller, a wearable computing device (e.g., an virtual/augmented reality device, etc.), an embedded computing device, a broadcasting computing device (e.g., a webcam, etc.), or any other type of computing device.

The participant computing device(s) 680 includes processor(s) 682 and a memory 684 as described with regards to the participant computing device 602. Specifically, the participant computing device(s) 680 can be the same, or similar, device(s) as the participant computing device 602. For example, the participant computing device(s) 680 can each include a teleconference participation system 686 that includes at least some of the modules 614 of participant computing device 602. For another example, the participant computing device(s) 680 may include, or may be communicatively coupled to, the same type of input and output devices as described with regards to input device(s) 630 and output device(s) 634 (e.g., device(s) 632. device(s) 636, etc.). Alternatively, in some implementations, the participant computing device(s) 680 can be different devices than the participant computing device 602, but can also facilitate teleconferencing with the teleconference computing system 650. For example, the participant computing device 602 can be a laptop and the participant computing device(s) 680 can be smartphone(s).

In particular, the participant computing device(s) 680 can participate in the same teleconferencing session as that of the participant computing device 602. At least some of the participant computing device(s) 680 can be co-located with the participant computing device 602. For example, one of the participant computing device(s) 680 can be a laptop device that is positioned across the table from the participant computing device 602 to participate in the same teleconferencing session as the participant computing device 602.

The network 699 can be any type of communications network, such as a local area network (e.g., intranet), wide area network (e.g., Internet), or some combination thereof and can include any number of wired or wireless links. In general, communication over the network 699 can be carried via any type of wired and/or wireless connection, using a wide variety of communication protocols (e.g., TCP/IP, HTTP, SMTP, FTP), encodings or formats (e.g., HTML, 6ML), and/or protection schemes (e.g., VPN, secure HTTP, SSL).

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

The following definitions provide a detailed description of various terms discussed throughout the subject specification.

As such, it should be noted that any previous reference in the specification to the following terms should be understood in light of these definitions.

Broadcast: as used herein, the terms "broadcast" or "broadcasting" generally refers to any transmission of data (e.g., audio data, video data, AR/VR data, etc.) from a central entity (e.g., computing device, computing system, etc.) for potential receipt by one or more other entities or devices. A broadcast of data can be performed to orchestrate or otherwise facilitate a teleconference that includes a number of participants. For example, a central entity, such as a teleconference server system, can receive an audio transmission from a participant computing device associated with one participant and broadcast the audio transmission to a number of participant computing devices associated with other participants of a teleconference session. For another example, a central entity can detect that direct peer-to-peer data transmission between two participants in a private teleconference is not possible (e.g., due to firewall settings, etc.) and can serve as a relay intermediary that receives and broadcasts data transmissions between participant computing devices associated with the participants. In some implementations, broadcast or broadcasting can include the encoding and/or decoding of transmitted and/or received data. For example, a teleconference computing system broadcasting video data can encode the video data using a codec. Participant computing devices receiving the broadcast can decode the video using the codec.

In some implementations, a broadcast can be, or otherwise include, wireless signaling that carries data, such as communications data, received in a transmission from a participant computing device. Additionally, or alternatively, in some instances, a broadcast can carry data obtained from a data store, storage device, content provider, application programming interface (API), etc. For example, a central entity can receive transmissions of audio data from a number of participant computing devices. The central entity can broadcast the audio data alongside video data obtained from a video data repository. As such, the broadcast of data is not limited to data received via transmissions from participant computing devices within the context of a teleconference.

Communications data: as used herein, the term "communications data" generally refers to any type or manner of data that carries a communication, or otherwise facilitates communication between participants of a teleconference. Communications data can include audio data, video data, textual data, augmented reality/virtual reality (AR/VR) data, etc. As an example, communications data can collectively refer to audio data and video data transmitted within the context of a videoconference. As another example, within the context of an AR/VR conference, communications data can collectively refer to audio data and AR/VR data, such as positioning data, pose data, facial capture data, etc. that is utilized to generate a representation of the participant within a virtual environment. As yet another example, communications data can refer to textual content provided by participants (e.g., via a chat function of the teleconference, via transcription of audio transmissions using text-to-speech technologies, etc.).

Participant: as used herein, the term "participant" generally refers to any user (e.g., human user), virtualized user (e.g., a bot, etc.), or group of users that participate in a live exchange of data (e.g., a teleconference such as a videoconference, etc.). More specifically, participant can be used throughout the subject specification to refer to user(s) within the context of a teleconference. As an example, a group of participants can refer to a group of users that participate remotely in a teleconference with their own participant computing devices (e.g., smartphones, laptops, wearable devices, teleconferencing devices, broadcasting devices, etc.). As another example, a participant can refer to a group of users utilizing a single participant computing device for participation in a teleconference (e.g., a videoconferencing device within a meeting room, etc.). As yet another example, participant can refer to a bot or an automated user (e.g., a virtual assistant, etc.) that participates in a teleconference to provide various services or features for other participants in the teleconference (e.g., recording data from the teleconference, providing virtual assistant services, providing testing services, etc.)

Transmission: As used herein, the term "transmission" generally refers to any sending, providing, etc. of data (e.g., communications data) from one entity to another entity. For example, a participant computing device can directly transmit audio data to another participant computing device. For another example, a participant computing device can transmit video data to a central entity orchestrating a teleconference, and the central entity can broadcast the audio data to other entities participating in the teleconference. Transmission of data can occur over any number of wired and/or wireless communications links or devices. Data can be transmitted in various forms and/or according to various protocols. For example, data can be encrypted and/or encoded prior to transmission and decrypted and/or decoded upon receipt.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method, comprising:
    obtaining, by a participant computing device that comprises one or more processing devices and is connected to a teleconferencing session, audio data captured using an audio capture device associated with the participant computing device, wherein the audio data comprises audio originating from an audio source co-located with the participant computing device;
    subsequent to obtaining the audio data, receiving, by the participant computing device, second audio data that comprises second audio captured using a plurality of second audio capture devices respectively associated with a plurality of second participant computing devices that are connected to the teleconferencing session;

based on the reception of the second audio data subsequent to the capture of the audio data, making, by the participant computing device, a determination that at least a portion of the second audio originates from the audio source co-located with the participant computing device; and based on the determination, generating, by the participant computing device, co-location information indicating that the participant computing device is co-located with at least one of the plurality of second participant computing devices;

wherein making the determination that the second audio originates from the audio source co-located with the audio capture device comprises processing, by the participant computing device, the audio and the second audio with a machine-learned co-location detection model to make the determination that the second audio originates from the audio source co-located with the audio capture device.

2. The computer-implemented method of claim 1, wherein the audio source is a participant associated with the participant computing device; and wherein both the audio and the second audio comprise a spoken utterance from the participant.

3. The computer-implemented method of claim 1, wherein the method further comprises providing, by the participant computing device, the co-location information to a teleconference computing system that orchestrates the teleconferencing session.

4. The computer-implemented method of claim 1, wherein the method comprises sending, by the participant computing device, the co-location information to the second participant computing device.

5. The computer-implemented method of claim 1, wherein receiving the second audio data further comprises receiving, by the participant computing device, preliminary co-location information indicating that at least two participant computing devices connected to the teleconferencing session are co-located; and wherein generating the co-location information comprises generating, by the participant computing device, the co-location information indicating that the participant computing device is co-located with the at least one of the plurality of second participant computing devices based on the determination and the preliminary co-location information.

6. The computer-implemented method of claim 5, wherein receiving the preliminary co-location information comprises receiving, by the participant computing device, the preliminary co-location information from a teleconference computing system that orchestrates the teleconferencing session, wherein the preliminary co-location information indicates that at least two participant computing devices connected to the teleconferencing session are co-located.

7. The computer-implemented method of claim 6, wherein making the determination that the at least the portion of the second audio originates from the audio source co-located with the participant computing device further comprises making, by the participant computing device, a preliminary determination of co-location between the participant computing device and at least one of the plurality of second participant computing devices; and sending, by the participant computing device, information indicative of the preliminary determination of co-location to the teleconference computing system.

8. The computer-implemented method of claim 1, wherein making the determination that the second audio originates from the audio source co-located with the audio capture device comprises:

identifying, by the participant computing device, occurrence of a feature in both the audio and the second audio; and determining, by the participant computing device, that the feature occurs at a time in the second audio subsequent to a time at which the feature occurs in the audio.

9. The computer-implemented method of claim 8, wherein identifying the occurrence of the feature in both the audio and the second audio comprises:

generating, by the participant computing device, a first spectrogram that represents the audio and a second spectrogram that represents the second audio, wherein the first spectrogram comprises a plurality of first peaks and the second spectrogram comprises a plurality of second peaks; and determining, by the participant computing device, that two of the plurality of first peaks form the feature and that two of the plurality of second peaks form the feature; and wherein determining that the feature occurs at the time in the second audio subsequent to the time at which the feature occurs in the audio comprises determining, by the participant computing device, that the feature occurs at a point in the second spectrogram subsequent to a point at which the feature occurs in the first spectrogram.

10. A participant computing device connected to a teleconferencing session, comprising:

one or more processors; and one or more non-transitory computer-readable media that store instructions that, when executed by the one or more processors, cause the participant computing device to perform operations, the operations comprising:

obtaining audio data captured using an audio capture device associated with the participant computing device, wherein the audio data comprises audio originating from an audio source co-located with the participant computing device;

subsequent to obtaining the audio data, receiving second audio data that travelled farther to reach the participant computing device than the audio data and that comprises second audio captured using a plurality of second audio capture devices respectively associated with a plurality of second participant computing devices that are connected to the teleconferencing session;

based on the reception of the second audio data subsequent to the capture of the audio data, making a determination that at least a portion of the second audio originates from the audio source co-located with the participant computing device; and based on the determination, generating co-location information indicating that the participant computing device is co-located with at least one of the plurality of second participant computing devices.

11. The participant computing device of claim 10, wherein the audio source is a participant associated with the participant computing device; and wherein both the audio and the second audio comprise a spoken utterance from the participant.

12. The participant computing device of claim 10, wherein the operations comprise providing the co-location information to a teleconference computing system that orchestrates the teleconferencing session.

13. The participant computing device of claim 10, wherein the operations comprise sending the co-location information to the second participant computing device.

14. The participant computing device of claim 10, wherein receiving the second audio data further comprises receiving preliminary co-location information indicating that at least two participant computing devices connected to the teleconferencing session are co-located; and wherein generating the co-location information comprises generating the co-location information indicating that the participant computing device is co-located with the at least one of the plurality of second participant computing devices based on the determination and the preliminary co-location information.

15. The participant computing device of claim 14, wherein receiving the preliminary co-location information comprises receiving the preliminary co-location information from a teleconference computing system that orchestrates the teleconferencing session, wherein the preliminary co-location information indicates that at least two participant computing devices connected to the teleconferencing session are co-located.

16. The participant computing device of claim 15, wherein making the determination that the at least the portion of the second audio originates from the audio source co-located with the participant computing device further comprises making a preliminary determination of co-location between the participant computing device and at least one of the plurality of second participant computing devices; and sending information indicative of the preliminary determination of co-location to the teleconference computing system.

17. The participant computing device of claim 10, wherein making the determination that the second audio originates from the audio source co-located with the audio capture device comprises:

identifying occurrence of a feature in both the audio and the second audio; and determining that the feature occurs at a time in the second audio subsequent to a time at which the feature occurs in the audio.

18. The participant computing device of claim 17, wherein identifying the occurrence of the feature in both the audio and the second audio comprises:

generating a first spectrogram that represents the audio and a second spectrogram that represents the second audio, wherein the first spectrogram comprises a plurality of first peaks and the second spectrogram comprises a plurality of second peaks; and determining that two of the plurality of first peaks form the feature and that two of the plurality of second peaks form the feature; and wherein determining that the feature occurs at the time in the second audio subsequent to the time at which the feature occurs in the audio comprises determining that the feature occurs at a point in the second spectrogram subsequent to a point at which the feature occurs in the first spectrogram.

19. One or more non-transitory computer-readable media that store instructions that, when executed by one or more processors of a participant computing device connected to a teleconferencing session, cause the one or more processors to perform operations, the operations comprising:

obtaining audio data captured using an audio capture device associated with the participant computing device, wherein the audio data comprises audio originating from an audio source co-located with the participant computing device;

subsequent to obtaining the audio data, receiving second audio data that comprises second audio captured using a plurality of second audio capture devices respectively associated with a plurality of second participant computing devices that are connected to the teleconferencing session;

subsequent to obtaining the audio data, separately receiving second audio data that travelled farther to reach the participant computing device than the audio data, the second audio data comprising audio captured by a second participant computing device and third audio data comprising audio captured by a third participant computing device, wherein the second audio data indicates the second participant computing device as an originating source of the second audio data;

based on the reception of the second audio data subsequent to the capture of the audio data, making a determination that at least a portion of the second audio originates from the audio source co-located with the participant computing device; and based on the determination, generating co-location information indicating that the participant computing device is co-located with the second participant computing device.

* * * * *